Patented Feb. 26, 1924.

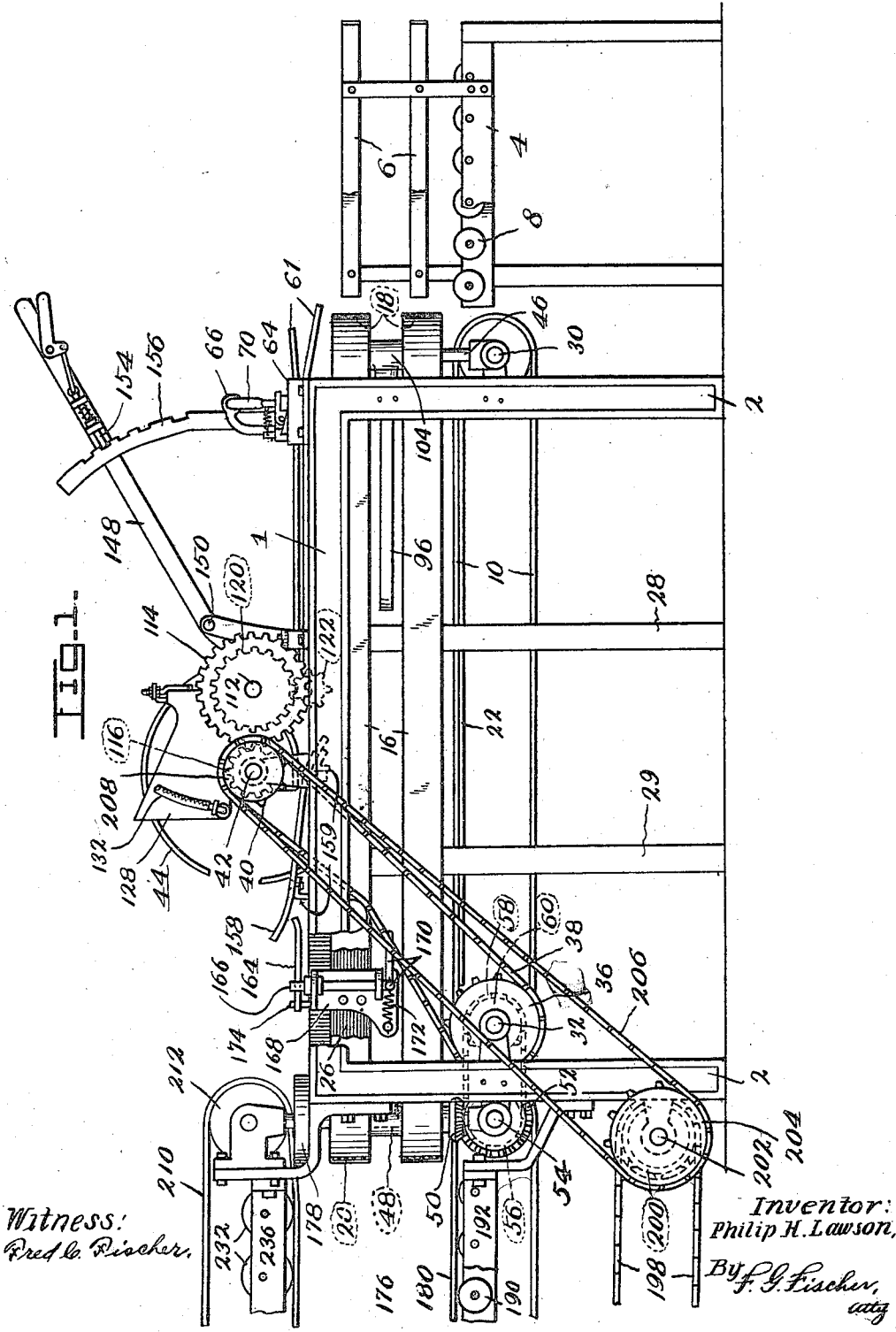

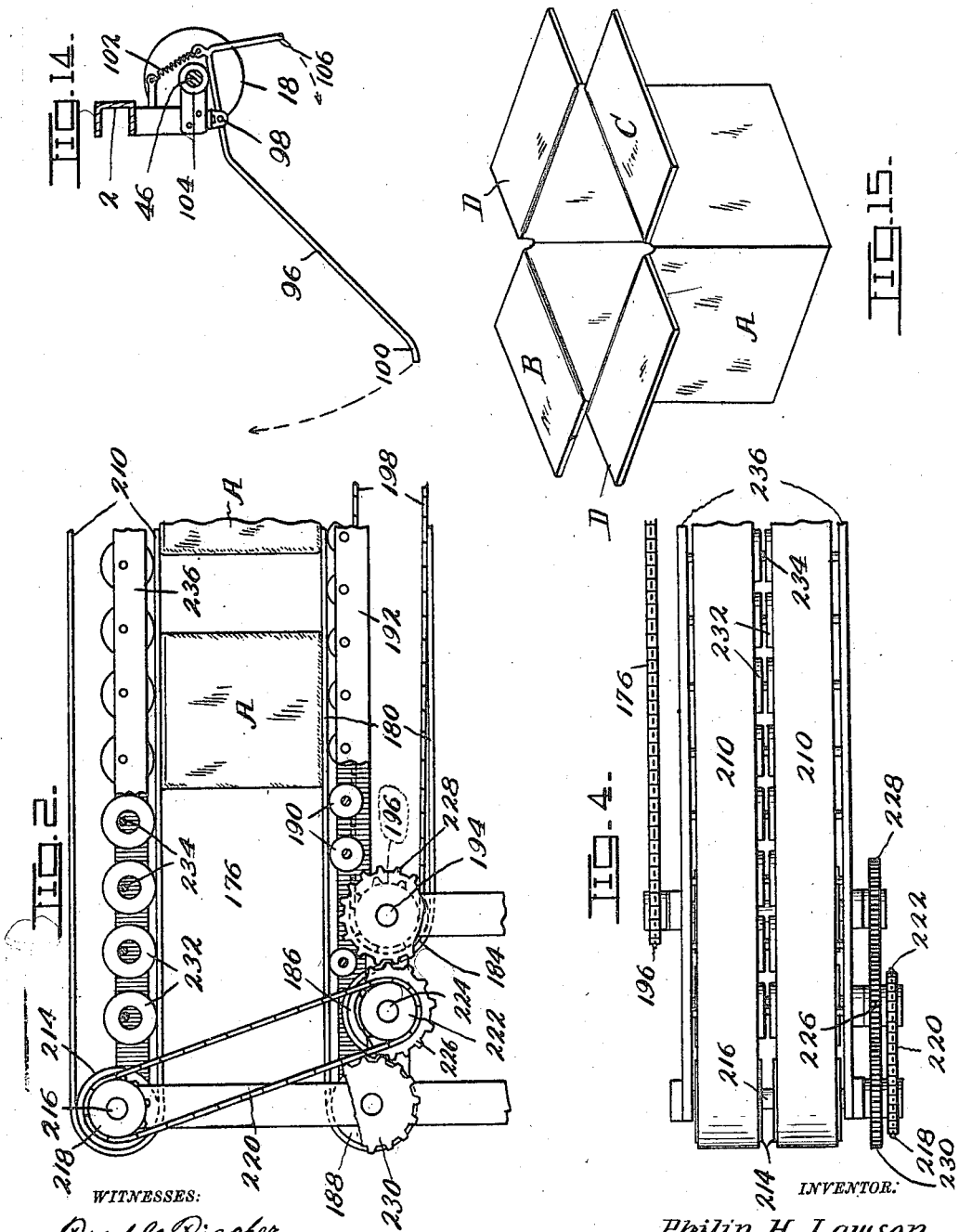

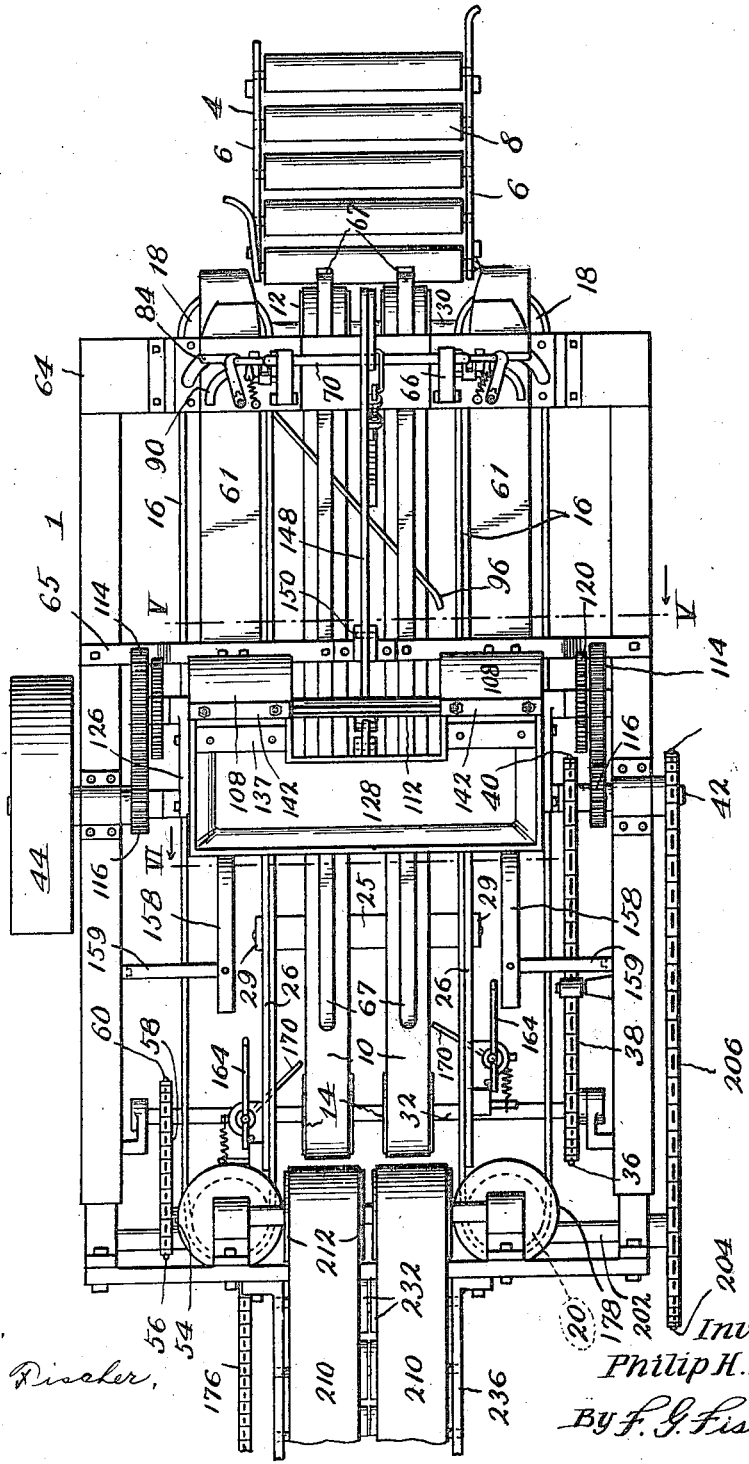

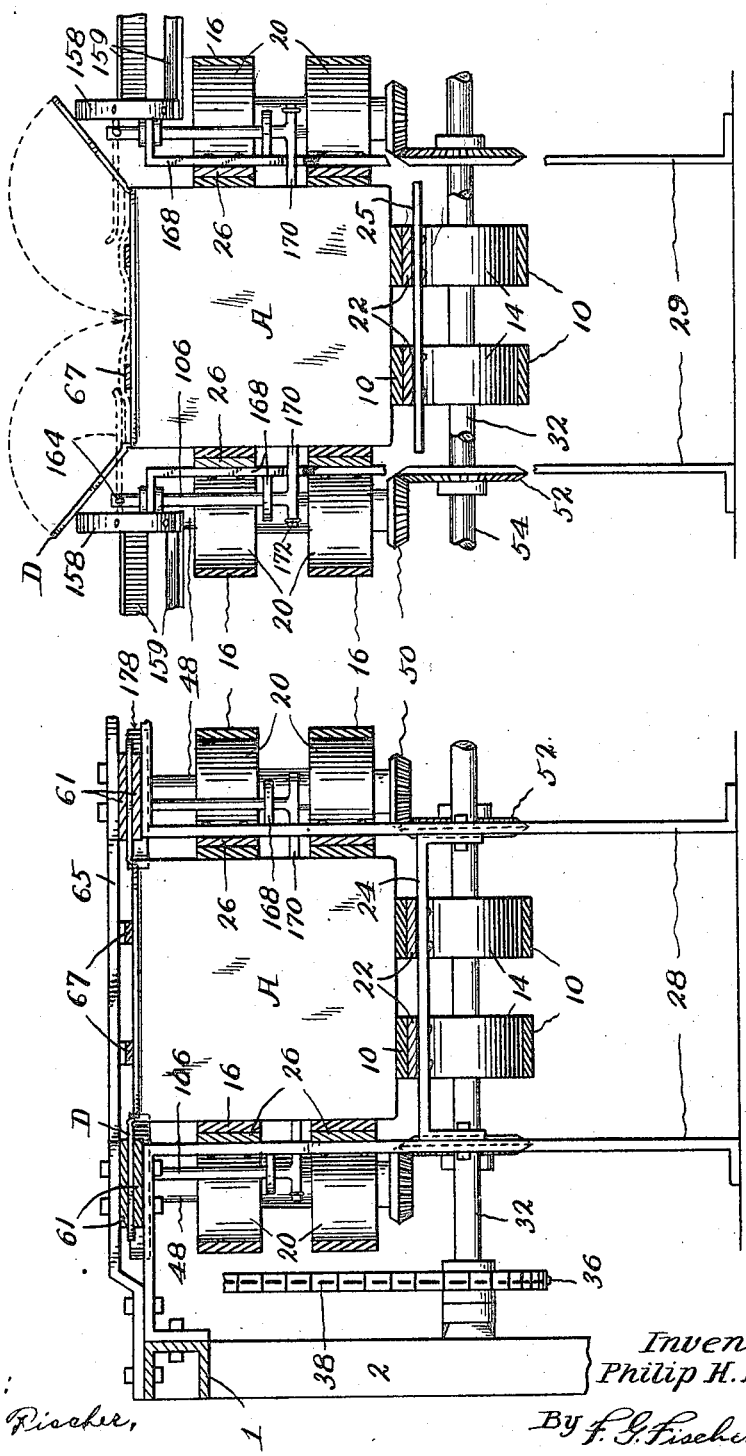

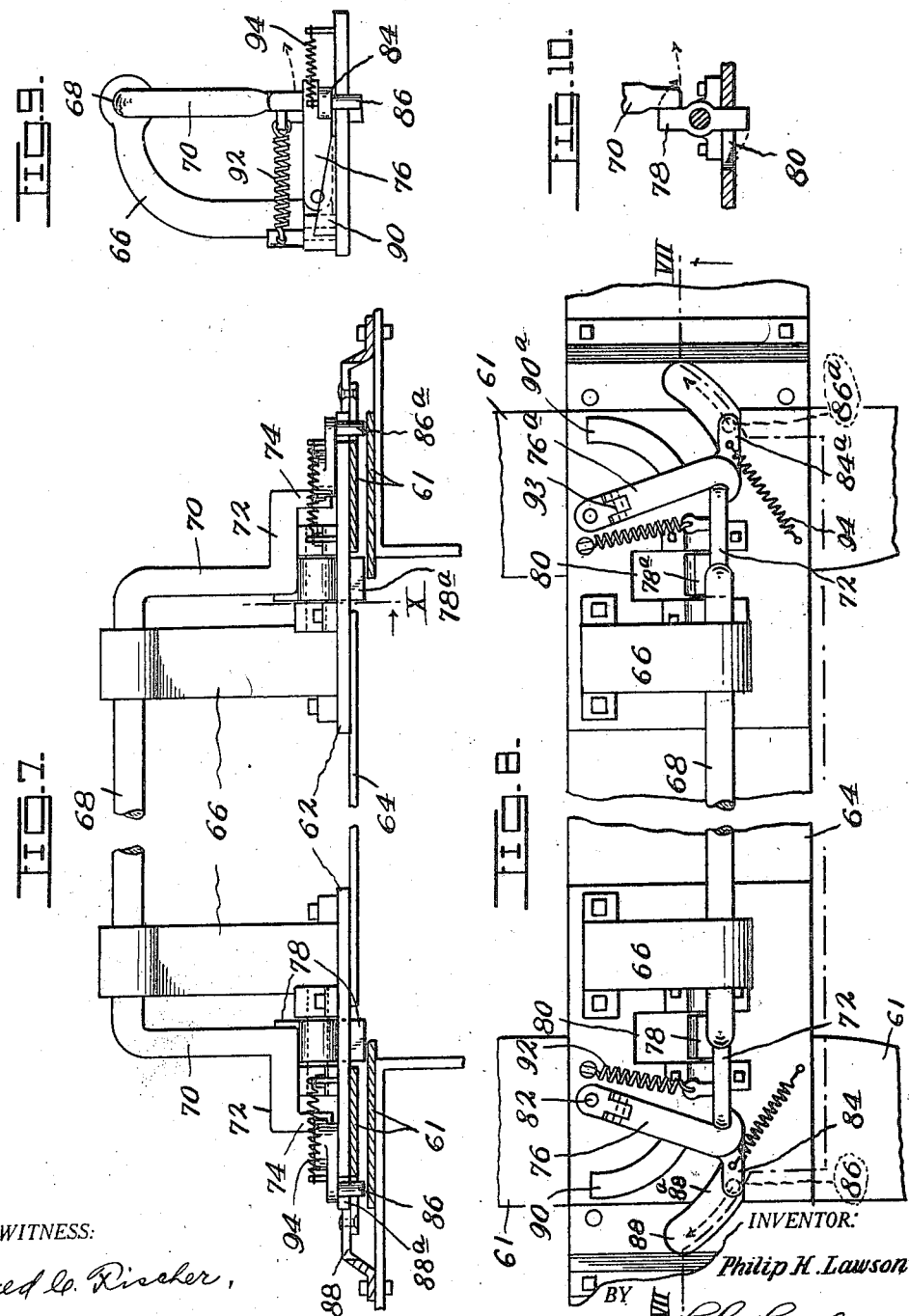

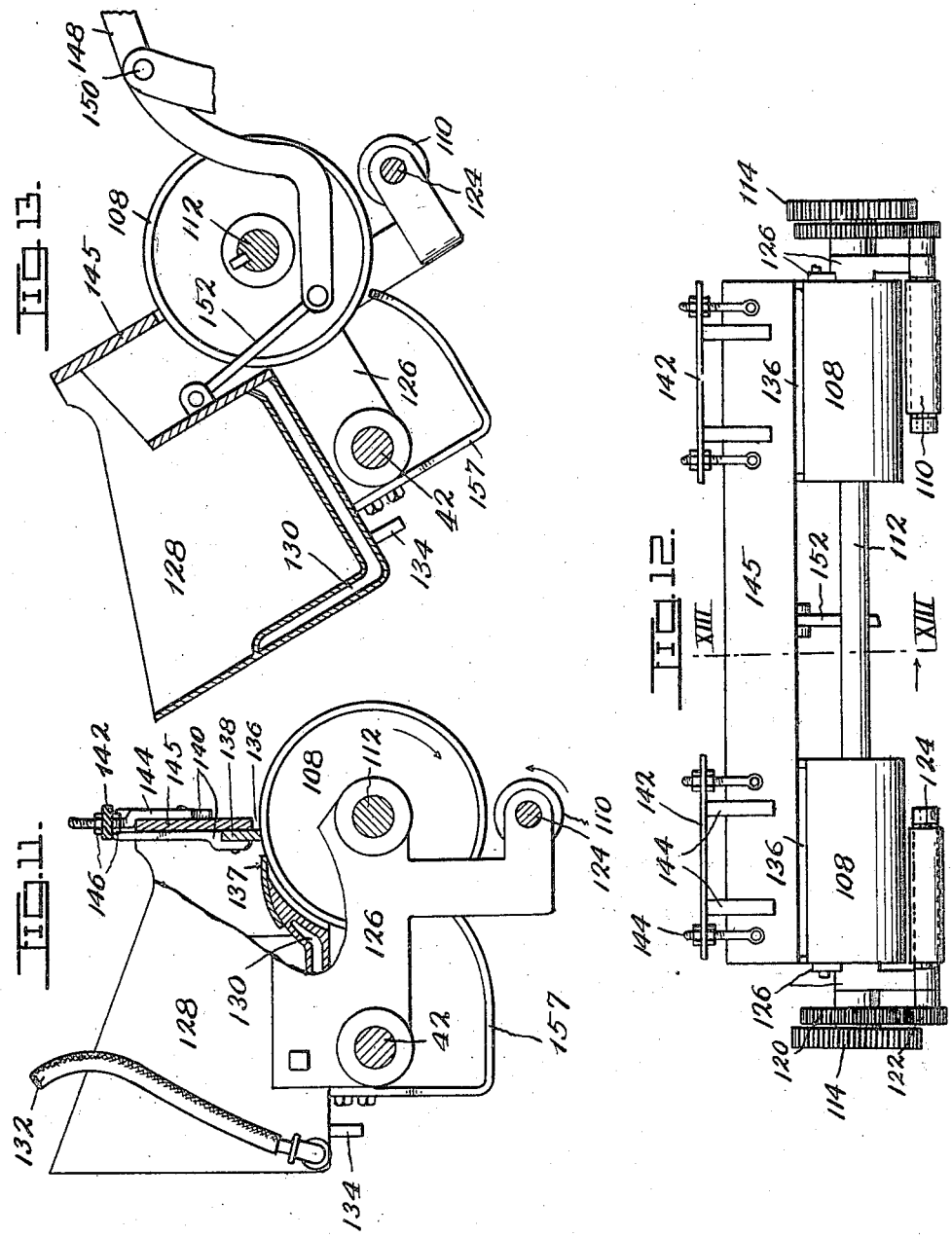

1,484,722

UNITED STATES PATENT OFFICE.

PHILIP H. LAWSON, OF PORTLAND, OREGON.

MACHINE FOR CONVEYING AND SEALING CONTAINERS.

Application filed April 30, 1921. Serial No. 465,632.

*To all whom it may concern:*

Be it known that I, PHILIP H. LAWSON, a citizen of the United States, residing at Portland, in the county of Multnomah and State of Oregon, have invented certain new and useful Improvements in Machines for Conveying and Sealing Containers, of which the following is a specification.

My invention relates to improvements in machines for conveying and sealing containers and for drying the sealing substance, and in its present form said machine is adapted to close and seal the tops of filled containers, although certain features and parts may be used for closing and sealing the bottom flaps of containers.

One object of the invention is to provide a machine capable of conveying and sealing a large number of containers in a given time and without injury to said containers.

Other objects will hereinafter appear, and in order that the invention may be fully understood, reference will now be had to the accompanying drawings, in which:
Fig. 1 is a side elevation, partly broken away, of the main portion of the machine.

Fig. 2 is a continuation of Fig. 1 with some parts broken away and others in section.
Fig. 3 is a plan view of that portion of the machine disclosed by Fig. 1.

Fig. 4 is a plan view of that portion of the machine disclosed by Fig. 2.

Fig. 5 is an enlarged vertical cross section on line V—V of Fig. 3, with the sealing mechanism and some other parts of the machine removed, and a container added.

Fig. 6 is an enlarged broken vertical section on line VI of Fig. 3, with some of the parts removed and a container added.

Fig. 7 is an irregular broken section on line VII—VII of Fig. 8, showing mechanism for starting the containers squarely into the conveyer, the guides for the container flaps being in section.

Fig. 8 is a broken plan view of the parts disclosed by Fig. 7.

Fig. 9 is a side elevation of the parts disclosed by Fig. 7, with the guides for the container flaps removed.

Fig. 10 is a fragmentary vertical section on line X of Fig. 7.

Fig. 11 is a side elevation partly in section of the glue rolls and a receptacle associated therewith.

Fig. 12 is a reduced front elevation of the parts disclosed by Fig. 11.

Fig. 13 is a vertical section on line XIII—XIII of Fig. 12 and enlarged to the size of Fig. 11.

Fig. 14 is a plan view of container-spacing mechanism.

Fig. 15 is a perspective view of one of the containers with the top flaps in open position.

Referring now in detail to the various parts, 1 designates the frame which is made of suitable longitudinal and cross members supported on legs 2.

4 designates a table having container guides 6 and rolls 8, from the latter of which the containers A are fed to the container conveyer which is supported largely within the frame 1 and comprises endless bottom and side belts and pulleys for carrying the containers A forward.

The bottom belts 10 run around pulleys 12 and 14 and coact with the side belts 16 running around pulleys 18 and 20, in carrying the containers along. The upper reaches of the bottom belts 10 are prevented from sagging beneath the weight of the filled containers A by longitudinal supports 22 mounted on cross bars 24 of the frame 1, while the inner or adjacent reaches of the belts 16 are held in frictional engagement with the sides of said containers A by longitudinal supports 26 mounted upon upright frame members 28 and 29.

The pulleys 12 and 14 are mounted upon shafts 30 and 32, respectively, the shaft 32 being provided with a sprocket wheel 36 driven by an endless sprocket chain 38, which in turn is driven by a sprocket wheel 40 fixedly mounted upon a main drive shaft 42 provided at one end with a drive pulley 44. The pulleys 18 and 20 are mounted upon vertical shafts 46 and 48, respectively, provided at their lower portions with bevel gears 50 driven by bevel gears 52 mounted upon a horizontal shaft 54 driven by a sprocket wheel 56 driven by an endless sprocket chain 58, which in turn is driven by a sprocket wheel 60 fixed upon the shaft 32.

When the containers A are started through the conveyer their front and rear flaps B and C are closed by hand while their side flaps D are spread open and directed between parallel guide plates 61 supported by cross bars 64 and 65 of the frame 1. The parallel guide plates 61 extend to the rear side of the bar 65 and direct the open flaps D between the glue rolls hereinafter mentioned. The front and rear flaps B and C are held in closed position as each container A is carried forward, by a pair of bars 67 supported by the cross bars 64 and 65 and extending backwardly adjacent to mechanism hereinafter described, for closing the side flaps D.

The containers A are fed by hand from the table 4 to the conveyer above-described and are caused to squarely enter said conveyer by the following-described mechanism and clearly disclosed by Figs. 7 to 10, inclusive: Said mechanism embodies a pair of plates 62 secured to the forward cross bar 64 of the frame 1. The plates 62 support a pair of bearings 66 spaced apart and in which a rock lever 68 is mounted. The rock lever 68 has downwardly extending arms 70 provided near their lower ends with horizontal extensions 72, having downwardly-extending terminals 74. The arms 70 are normally held in vertical position as shown on the drawings by a pair of latches 76, 76$^a$, engaging the front sides of the terminals 74, and a pair of stops 78, 78$^a$, engaging the rear sides of the horizontal extensions 72 and the forward sides of slots 80 in the plates 62. The latches 76, 76$^a$, are mounted at their rear ends upon pivots 82 and provided at their forward ends with laterally projecting arms 84, 84$^a$, having depending lugs 86, 86$^a$, respectively, extending downwardly into the path of the side flaps D of the containers A through arcuate slots 88, 88$^a$, in the cross bar 64 of the frame 1. The lower ends of the stops 78, 78$^a$, like the lugs 86, also extend down into the path of the side flaps D. With the foregoing construction it is obvious that if a container A starts forwardly into the conveyer with one side slightly in advance of the other—we will assume the left side—the flap D of the advanced side will contact the lug 86 and swing the latch 76 out of engagement with the rock lever 68, after which its further progress is checked by the stop 78 until the flap D at the right advances into engagement with the lug 86$^a$ and pushes the latch 76$^a$ out of engagement with the rock lever 68 and contacts the stop 78$^a$. When the latches 76 and 76$^a$, are thus disengaged from the rock lever 68 the same is free to be swung forward by the upper ends of the stops 78, 78$^a$, as the lower ends of the same are pushed backwardly and upwardly by the flaps D of the advancing container. The flaps D also push the lugs 86, 86$^a$ backwardly until they are raised out of the path of said flaps D by the latches 76 and 76$^a$, which are pushed up inclined tracks 90 and 90$^a$, fixed upon the plates 62. After the flaps D pass from beneath the stops 78, 78$^a$, and the lugs 86, 86$^a$, said stops 78, 78$^a$ are restored to normal position by the rock lever 68, which is drawn backwardly by coil springs 92, and the latches 76, 76$^a$, are restored into engagement with said rock lever 68 by their respective springs 94. The latches 76, 76$^a$, have joints 93 which permit the forward portions of said latches to travel up the inclined tracks, as stated.

After the container A has been carried forward a slight distance by the conveyer it actuates a spacing member, Fig. 14, which prevents the succeeding containers from being fed forward too fast to the conveyer. In the present instance said spacing member consists of a lever 96 mounted intermediate its ends upon a fulcrum 98 and normally held with its rear end 100 in the path of the successive containers by a coil spring 102, which holds the forward portion of the lever against one of the bearings 104 of the adjacent shaft 46. As the container strikes the rear portion of the lever 96 it swings the same to one side, which operation causes the forward end of said lever to swing outwardly across the entrance to the conveyer, said forward end being bent at right angles as indicated at 106 to present a relatively broad surface to the following conveyer in order not to damage the same. After the initial container passes out of engagement with the rear end of the lever 96 the same is restored to normal position by the spring 102, so that the following container may enter the conveyer.

As the initial container continues to move forward its side flaps D pass beneath a pair of glue rolls 108, Figs. 11 to 13, inclusive, which spread glue upon the upper surface of said flaps D. The glue rolls 108 are arranged at the rear of the spacing lever 96 and are associated with a pair of smaller rolls 110 over which the flaps D pass and whereby they are forced into engagement with the peripheries of the glue rolls 108. The glue rolls 108 are fixed upon a shaft 112 provided at each end with a fixedly mounted gear wheel 114 driven by a pair of pinions 116 fixed upon the main drive shaft 42. The shaft 114 is also provided with a pair of fixedly mounted gear wheels 120, which drive a pair of smaller gear wheels 122 fixed to the shafts 124 of the small rolls 110, which are driven faster than the glue rolls 108 to cause the container flaps D to have a sliding contact with said glue rolls, so that the same will more uniformly distribute the glue or other adhesive substance upon said flaps. The shafts 112 and 124 are mounted in bearings 126, which in turn are rockably mounted upon the main drive shaft 42 and support a glue receptacle 128, the bottom and sides of which are surrounded by a steam chamber 130 supplied with steam through a hose 132 to keep the glue in a fluid state. The hose 132 is connected to a suitable steam supply (not shown). The condensed steam in the steam chamber 130 escapes through an exhaust nozzle 134. The glue flows from the receptacle 128 to the periphery of the glue rolls 108 through ports 136 adapted to be closed by gates 138 carried by U-shaped guides 140, slidably engaging the outer and inner surfaces of the front walls 145 of the receptacle 128. The guides 140 are fixed at their upper portions to cross bars 142 adjustably mounted on threaded members 144 secured to the front wall 145 of the receptacle 128. The bars 142 are raised and lowered to open and close the gates 138 to any desired degree, and after said gates 138 have been adjusted as desired they are secured from further movement by nuts 146 threaded upon the members 144 and engaging the upper and lower sides of the bars 142. When the machine is stopped for any cause the flow of glue to the rolls 108 may be quickly checked without changing the position of the gates 138, by rocking the receptacle 128 to the position disclosed on Fig. 13, which operation raises the ports 136 above the level of the glue in the receptacle 128. Rocking of the receptacle 128 as referred to, is accomplished through the intermediacy of a hand lever 148 fulcrumed at 150 and connected to the front portion of the receptacle 128 through the intermediacy of a link 152. The lever 148 is secured at any point of its adjustment through the intermediacy of a latch 154 and a segment 156, which latter is fixed to the cross bar 64. After the side flaps D have passed between the rolls 108 and 110, they are still held in open position by a pair of members 157 secured to the bearings 126. The glue is spread over the rolls 108 by plates 137, secured to the bottom of the receptacle 128 near the ports 106.

As the side flaps D pass beneath the members 157 they pass over a pair of inclined members 158, Figs. 1, 3 and 6, supported by transverse frame members 159 secured to the two main side members of the frame 1. As the container moves forward its side flaps D travel upwardly on the inclined members 158 as disclosed by Fig. 6, and are engaged by oscillatory folding elements which close said flaps D over the front and rear flaps B and C, respectively, which are still held in closed position by the rear ends of the guide bars 67. The oscillatory folding devices are similar in construction and each consists of an arm 164 for engaging and closing the adjacent flap D. The arm 164 is fixed to the upper end of a vertical shaft 166 journaled in a bracket 168, secured to the adjacent uppermost belt support 26. The lower end of the shaft 166 has a crank arm 170, which normally extends into the path of the container where it is yieldably held by a coil spring 172 which holds the rear end of the arm 164 against a stop 174. With the foregoing construction it is apparent that as the container moves the crank arms 170 backwardly against the action of the springs 172 the arms 164 are brought into engagement with the undersides of the inclined flaps D, Fig. 6, and fold said flaps to closed position as described.

After the side flaps D of the container have been closed, said container enters a dryer 176 and as it enters said dryer its two upper side portions are squared up by a pair of rolls 178, mounted upon the upper ends of the vertical shafts 48. The dryer 176 is of such length that the glue on the flaps D will have time to dry or set before the container reaches the discharge end of said dryer 176 and thus insure the flaps D remaining in closed position, so that the containers may be shipped without loss of contents. The dryer 176 embodies a pair of lower endless belts 180, upon which the container is delivered by the belts 10 and 16. The belts 180 travel around pulleys on the shaft 54 and pulleys 184, 186 and 188 at the delivery end of the dryer and their upper reaches which support the containers are in turn supported by anti-friction rollers 190 journaled in side bars 192 of the dryer frame. The pulleys on the shaft 54 and around which the belts 108 travel as stated, are similar in arrangement, function and operation to those of the pulleys 212, Figs. 1 and 3, and hence it is not deemed necessary to show them on the drawings. The pulleys 184 are mounted upon a shaft 194 driven by a sprocket wheel 196, which in turn is driven by an endless sprocket chain 198 driven by a sprocket wheel 200 fixed upon a shaft 202 provided with another sprocket wheel 204, driven by an endless sprocket chain 206 driven by a sprocket wheel 208 fixed upon the drive shaft 42. The lower belts 180 are assisted in carrying the containers forward by upper endless belts 210 running around pulleys 212 and 214, which latter are mounted upon a shaft 216 provided with a sprocket wheel 218 driven by an endless sprocket chain 220 running around a sprocket wheel 222 fixed upon a shaft 224 and provided with a cog wheel 226 driven by a cog wheel 228 fixed upon the shaft 194. The cog wheel 226 in turn drives a cog wheel 230 fixed to the shaft of the pulleys 188. Pressure is applied to the lower reaches of the upper belts 210 by heavy rollers 232 loosely mounted upon shafts 234 carried by the upper longitudinal members 236 of the dryer frame. By thus loosely mounting the heavy rollers 232 they are free to press the lower reaches of the belts 210 downwardly upon the flaps D and cause the glue to firmly adhere to the front and rear flaps B and C and thus reliably secure all of the flaps in closed position. The foregoing arrangement insures equal pressure upon the two side flaps D, even though one side of the container be higher than the other.

By constructing and arranging the parts as shown and described, a machine is provided which is capable of rapid work and requires very little attention on the part of the operator, as the containers are automatically sealed and delivered, and while I have illustrated the preferred embodiment of the invention I reserve the right to make such changes in the construction, combination, and arrangement of parts as properly fall within the spirit and scope of the claims.

Having thus described my invention, what I claim and desire to secure by Letters Patent, is:

1. In a machine of the character described, a conveyer for containers having flaps, means actuated by a number of said flaps for properly directing the containers into said conveyer, and means for applying an adhesive substance to a number of the flaps of each container as it is carried forwardly by the conveyer.

2. In a machine of the character described, a conveyer for containers having flaps, means embodying elements extending into the path of and actuated by a number of said flaps for properly directing the containers into said conveyer, means for applying an adhesive substance to a number of the flaps of each container as it is carried forwardly by the conveyer, and means associated with the conveyer for closing said flaps.

3. In a machine of the character described, a conveyer for containers having flaps, means for holding the two side flaps of each container in open position as it is carried forwardly by the conveyer, mechanism adjacent to the entrance of the conveyer for positively preventing one flap from moving ahead of its companion, and means for applying an adhesive substance to the open flaps.

4. In a machine of the character described, a conveyer for containers having flaps, means for holding the front and rear flaps in closed position, means for holding the side flaps in open position, means for applying an adhesive substance to the open flaps, and means actuated by the containers for closing the side flaps after the adhesive substance has been applied thereto.

5. In a machine of the character described, a conveyer for containers having flaps, means associated with said conveyer for holding the two side flaps in open position, an element operably disposed in the path of each open flap, and mechanism to secure said elements in active position until both are engaged by the open flaps so that one flap cannot advance ahead of the other.

6. In a machine of the character described, a conveyer for containers having flaps, means associated with said conveyer for holding the two side flaps in open position, an element operably disposed in the path of each open flap, a lever for securing said elements in active position until both are engaged by the open flaps so that one flap cannot advance ahead of the other, latches for securing said lever in active position, and means actuated by the open flaps for disengaging said latches from the lever so that the same will allow the elements to be moved to inactive position.

7. In a machine of the character described, a pair of glue rolls for applying glue to the flaps of containers, a second pair of rolls for holding the flaps against the first pair, a glue receptacle rockably mounted and provided with ports through which the glue may flow to the first pair of rolls, means arranged at the ports for regulating the flow of glue therethrough, means for heating the receptacle to retain the glue in a liquid state, and means for rocking the receptacle and the rolls to raise the ports above the level of the glue within said receptacle.

8. In a machine of the character described, a conveyer for containers having flaps, means for holding the front and rear flaps in closed position, means for holding the side flaps in open position, means for applying an adhesive substance to the open flaps, inclined means for partly closing the side flaps, and oscillatory means actuated by the containers for completely closing said side flaps.

9. In a machine of the character described, a conveyer for containers having flaps, means for partly closing said flaps, and means actuated by the containers for completely closing said flaps.

10. In a machine of the character described, a conveyer for containers having flaps, means for partly closing said flaps, means actuated by the containers for completely closing said flaps, and resilient means for restoring said completely-closing means to normal position.

In testimony whereof I affix my signature, in the presence of two witnesses.

PHILIP H. LAWSON.

Witnesses:
PAUL HIRSH,
F. G. HILLS.